United States Patent [19]

Meier et al.

[11] Patent Number: 4,553,836

[45] Date of Patent: Nov. 19, 1985

[54] METHOD AND APPARATUS FOR ELECTROOPTICAL DISTANCE MEASUREMENT

[75] Inventors: Dietrich Meier, Erlinsbach; Hans-Ulrich Minder, Aarwangen, both of Switzerland

[73] Assignee: Kern & Co. AG., Aarau, Switzerland

[21] Appl. No.: 412,496

[22] Filed: Aug. 30, 1982

[30] Foreign Application Priority Data

Sep. 29, 1981 [CH] Switzerland .......................... 6249/81

[51] Int. Cl.[4] .......................... G01C 3/08; G01S 7/28
[52] U.S. Cl. .................................. 356/5; 343/17.1 R
[58] Field of Search ............. 356/5; 343/17.1 R, 13 R

[56] References Cited

U.S. PATENT DOCUMENTS

| | | | |
|---|---|---|---|
| 3,900,259 | 8/1975 | Mott et al. | 356/5 |
| 3,900,261 | 8/1975 | Wingate | 356/5 |
| 4,067,013 | 1/1978 | Smith | 343/17.1 R X |
| 4,070,673 | 1/1978 | Schmidt et al. | 343/17.1 R X |
| 4,074,264 | 2/1978 | Wilmonti | 343/17.1 R |
| 4,274,736 | 6/1981 | Balmer | 356/5 |
| 4,297,030 | 10/1981 | Chaborski | 356/5 |
| 4,308,537 | 12/1981 | Berry et al. | 356/5 X |

*Primary Examiner*—S. C. Buczinski
*Assistant Examiner*—John B. Sotomayor
*Attorney, Agent, or Firm*—Michael E. Zall

[57] ABSTRACT

With an electrooptical distance meter impulses of light are transmitted over the distance. The distance is found by counting the duration of gating signals which last between transmission and reception of the light impulses. 10,000 times of travel generated by a first digital circuit (16, 17, 18) are communicated to a second digital circuit (1, 19, 20) for storing and processing. The distance is computed by the second circuit (1, 19, 20) by forming a mean value from the more frequent counts. By evaluation of artificial gating signals of various durations and by generation of gating signals from the light impulses by means of various threshold levels an improved accuracy of distance measurement is achieved, even when measuring on natural, non cooperative objects.

7 Claims, 4 Drawing Figures

METHOD AND APPARATUS FOR ELECTROOPTICAL DISTANCE MEASUREMENT

BACKGROUND OF THE INVENTION

1. Field of the Invention

This invention relates in general to range finding by light beam, light detector and time delay, such as may be used in field and land surveying. An improved precision may be thus achieved while at the same time natural, non cooperative objects may be measured, although the invention is not to be limited to these particular applications.

2. Description of the Prior Art

Electrooptical distance meters are well known, for example from U.S. Pat. No. 4,274,736 and from Allgemeine Vermessungsnachrichten, Karlsruhe, FR Germany, 6/1973, page 201–207. In that case the light beam is produced continuously by an infrared source which is amplitude modulated at a frequency of 15 MHz. The measured time delay is the phase difference between the modulation as transmitted and as received. The phase difference is measured digitally by means of electronic circuits after a frequency conversion. Measurement accuracy is achieved simply by counting a great number (e.g. 300,000) of phase differences from consecutive modulation periods and by computing the distance by the arithmetic mean of the phase differences.

Erroneous results caused by interference of the reflected light beam or by altogether missing the reflector may be avoided by a simple blanking circuit which interrupts signal evaluation at low level of reflected beam intensity. This may be done because such apparatus is used exclusively with reflectors at the other end of the distance which produce a rather strong reflected beam.

There are also known laser distance meters which transmit light impulses by a laser generator (e.g. DE-OS 28 40 605). In that case reflectors may be unnecessary, but there is a greater risk of errors due to troubled reflections, misaiming, multiple echos, etc., than with the first mentioned systems. These risks are reduced in a known manner by adjustable blanking circuits which enable reception only during a time window corresponding to an adjustable reduced distance range. These blanking circuits are principally designed to protect the light receiver from damage by exposure to bright illumination, blanking of false echos is only a secondary effect.

Another known electrooptical range finder (DE-AS 2 420 194) with evaluation of a number of consecutively measured phase differences has a digital circuit for computing the statistical variance of these measured values. The variance is compared to an internally stored limit and the range result is rejected if the variance exceeds the limit. Thus no selection is made between good and faulty single measured values. Even acceptable range results may be impaired by erratic reflexes without any information on the measured distance. An object of the present invention is to provide a method and an apparatus for electrooptical distance measurement with an improved accuracy for non-cooperative objects as well as for objects with reflectors. Another object is to reject from evaluation any single measured values with a certain probability of being in error.

The foregoing objects, other objects as well as numerous specific features of the present invention are set forth in the following disclosure.

SUMMARY OF THE PRESENT INVENTION

The present invention comprises a method for electrooptical distance measurement, whereby impulses of light are transmitted to an object and back to a photoelectric receiver, and pairs of electrical signal impulses are generated from respectively the outgoing and the returning light impulses. The distance is computed from the time of travel of the light impulses given by the time between each pair of signal impulses. This is done by the steps (a) generating gating signals which last between the occurrence of at least one threshold value at mutually corresponding edges of the pairs of signal impulses, (b) gating, by means of the gating signals for each threshold value, a gate which passes the output of a frequency stabilized clock-oscillator on to a frequency-counter, while the switching instants of the gate and the impulses of the clock-oscillator are uncorrelated, (c) calculating, for each threshold value a corresponding duration of gating signals by the weighted mean of the more frequent counts of the frequency-counter, and (d) obtaining a characteristic time of travel of the light impulses for the distance from the dependence of the calculated duration of gating signals upon the threshold value.

An embodiment of an apparatus for electrooptical distance measurement with a first digital circuit for generating the time between pairs of signal impulses comprises a second digital circuit for cooperation with the first circuit and for generating the measured distance result.

Other objects, features and advantages of the present invention will be apparent from the following detailed description of certain preferred embodiments thereof when taken in conjunction with the accompanying drawings.

DESCRIPTION OF THE PREFERRED EMBODIMENTS

Figure 1:
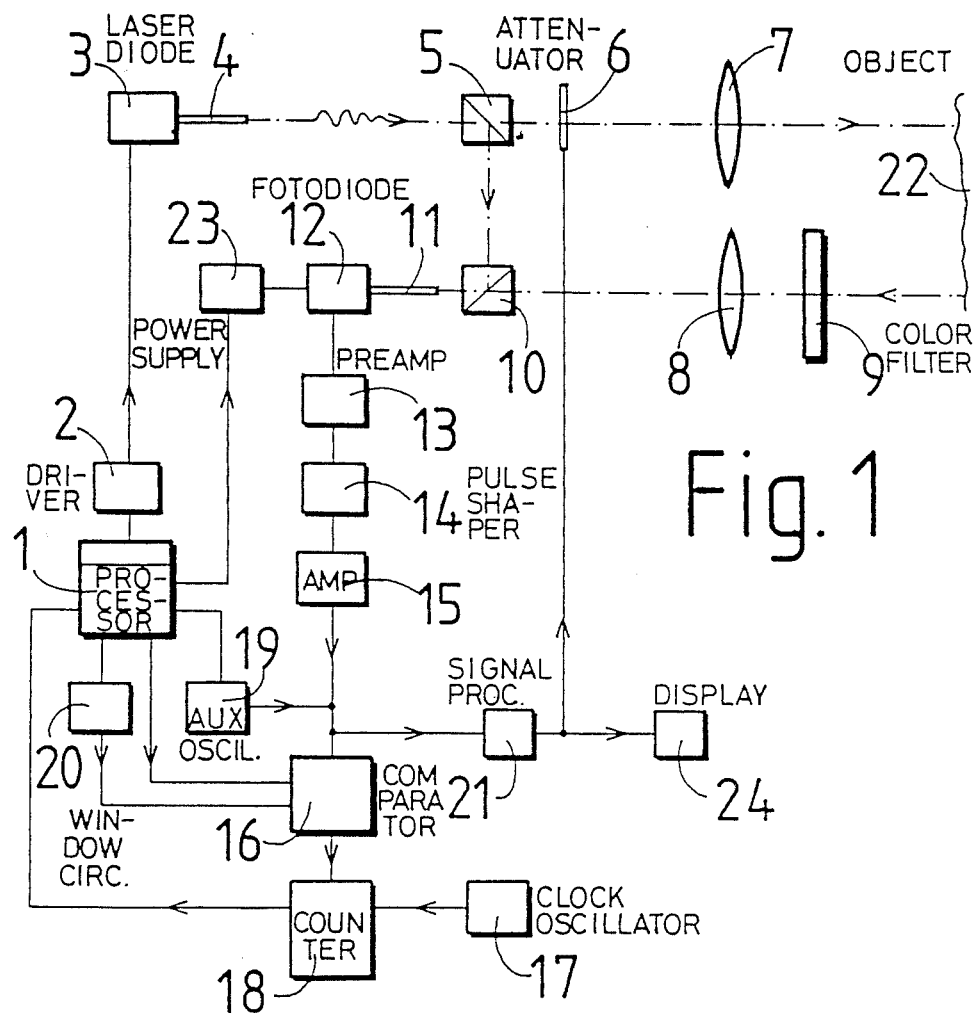
FIG. 1 illustrates a general block diagram of an embodiment of apparatus for electrooptical measurement according to the invention.

A laser diode 3 is shown in FIG. 1 for transmission of very short infrared light impulses (infrared wavelength $\lambda = 904$ nm). The transmission of light impulses is effected by current impulses generated by a driver stage 2 when triggered by a start signal from a processor stage 1. The laser diode 3 is joined to a short optical fiber 4 which serves to homogenize the traversing light impulses. At a beam splitting cube 5 about 1% of the optical power of the light impulses from laser diode 3 is branched off into an optical short path. Then the light impulses pass a controlled liquid crystal attenuator 6, a transmitter lens 7 and the path up to an object 22 at the distance to be measured. The object 22 may be a reflecting cooperative one, e.g. a mirror, a combination of mirrors, a cube corner or a reflecting foil. But it may also be a non-cooperative object which scatters back to the transmitter a fraction of the light impulses, e.g. a tree, a wall or a vehicle. A reflected or scattered part of the transmitted light impulses returns to a receiver lens 8 via a narrow band color filter 9 to reduce ambient light. The received light passes a beam combining cube 10 which adds about 1% of the optical power from the short path branched off at the splitting cube 5. Both, light impulses from the object 22 and from the short path reach an avalanche fotodiode 12 for conversion into electrical signal impulses, after passing a short optical fiber 11 in front of the diode 12.

The operating point of the fotodiode 12 is adjusted by a controlled bias voltage generated by a power supply 23 which is controlled by the processor stage 1. A preamplifier 13 is provided for the output signals of fotodiode 12. The amplified impulse signals may then pass a pulse shaping stage 14 to improve their edges. Stage 14 may be omitted, but it is useful if weak signals or interference are present. After passing a second amplifier 15 the impulse signals are fed to a comparator stage 16 which receives an adjustable threshold signal from the processor 1.

Due to the different length of the short path between cubes 5 and 10 and measured path to and from object 22 the pair of short path impulse and measured path impulse has a temporal shift. From this duration the length of the measured distance to object 22 is found. If the short path impulse exceeds the threshold at comparator 16, a gating signal is started which lasts until the measured path impulse exceeds the said threshold and stops the gating signal. Thus the gating signal lasts for the temporal shift of the pair of impulses. Now, a counter 18 is gated by the gating signal to count the leading edges coming from a clock oscillator 17. This is a crystal controlled time standard. As its frequency is 150 MHz, a count of one corresponds to a 1 m step of the measured distance. The count result, giving the distance in meters, is passed to processor 1 for storing in a listing. Thereafter a new light impulse is triggered from processor 1 at laser diode 3 via driver 2.

For checking reception of avalanche fotodiode 12 and to control the attenuator 6, the output of amplifier 15 is also passed to a signal processing stage 21 which drives a display 24. Display 24 comprises a selective circuit to select display of either the start or the stop impulses. Selection is effected by a select signal from processor 1 (not shown in FIG. 1). This select signal is also used as a window signal for enabling reception of the stop count impulse from object 22. The window signal has an adjustable duration (length) and is output by processor 1 at the start of each new light impulse at laser diode 3. The window signal duration is output in coded form from processor 1 to a window circuit 20. At the start of each laser impulse circuit 20 generates a window square wave of corresponding length that is fed to the comparator stage 16. A 5 MHz-oscillator 19 is provided for feeding square impulses to comparator 16 at its input for the start- and stop signals from amplifier 15, in order to determine an additive constant error C occurring at the count of the time of travel at comparator 16 and depending upon the threshold value. This will be described below more in detail.

The function of the apparatus for electrooptical distance measurement as described above in conjunction with FIG. 1 is as follows:

Prior to each start of a laser impulse at laser diode 3 the length of a window signal for noise blanking and the level of the threshold value are output in coded form by the processor circuit 1 to respectively the window circuit 20 and the comparator stage 16. After triggering a laser impulse by a start sigral from processor 1, the difference in time of travel between each pair of corresponding laser impulses, is counted at the counter 18. The resulting count is loaded into processor 1 after a fixed time lag, the counter being reset to zero. Thus a block of 10,000 count results is stored in circuit 1. A distribution table of the results is generated by means of a sorting routine. From two or three times of travel counted most frequently, a distance result is calculated by the weighted mean, and the ratio of the number of said most frequent counts over the total number of counts is calculated.

Figure 2:
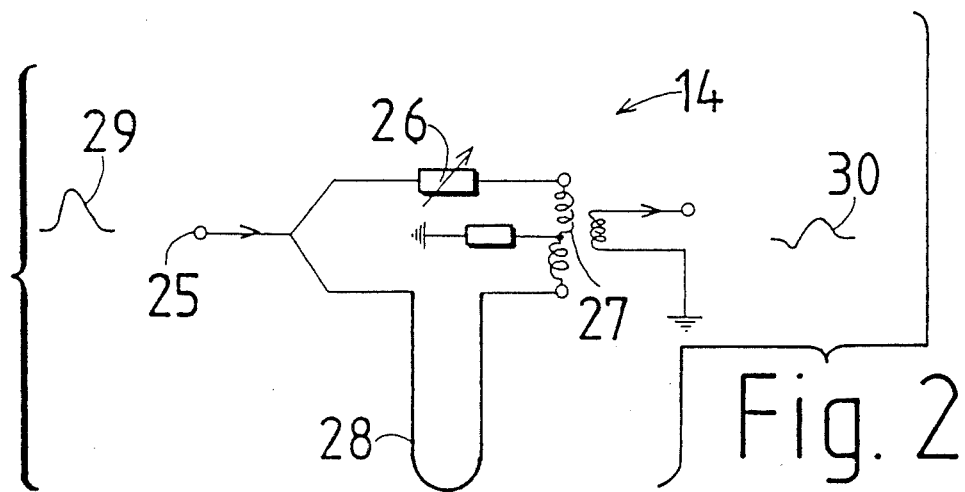
FIG. 2 illustrates a circuit of a pulse-shaping stage to be used according to FIG. 1.

FIG. 2 shows a circuit diagram of an embodiment of the pulse-shaping stage 14 to improve the edges of the received impulse signals. Incoming signals 29 are branched at the input 25. One component is fed to a hybrid T divider 27 via an attenuator 26, the other component reaches divider 27 via a delay line 28. Thus, the signal components get a mutual time shift and inversion before summation at divider 27. As shown by signal shapes 29, 30 this stage 14 effects a higher pulse edge, facilitating evaluation of signals with rounded edges or low level.

Figure 3:
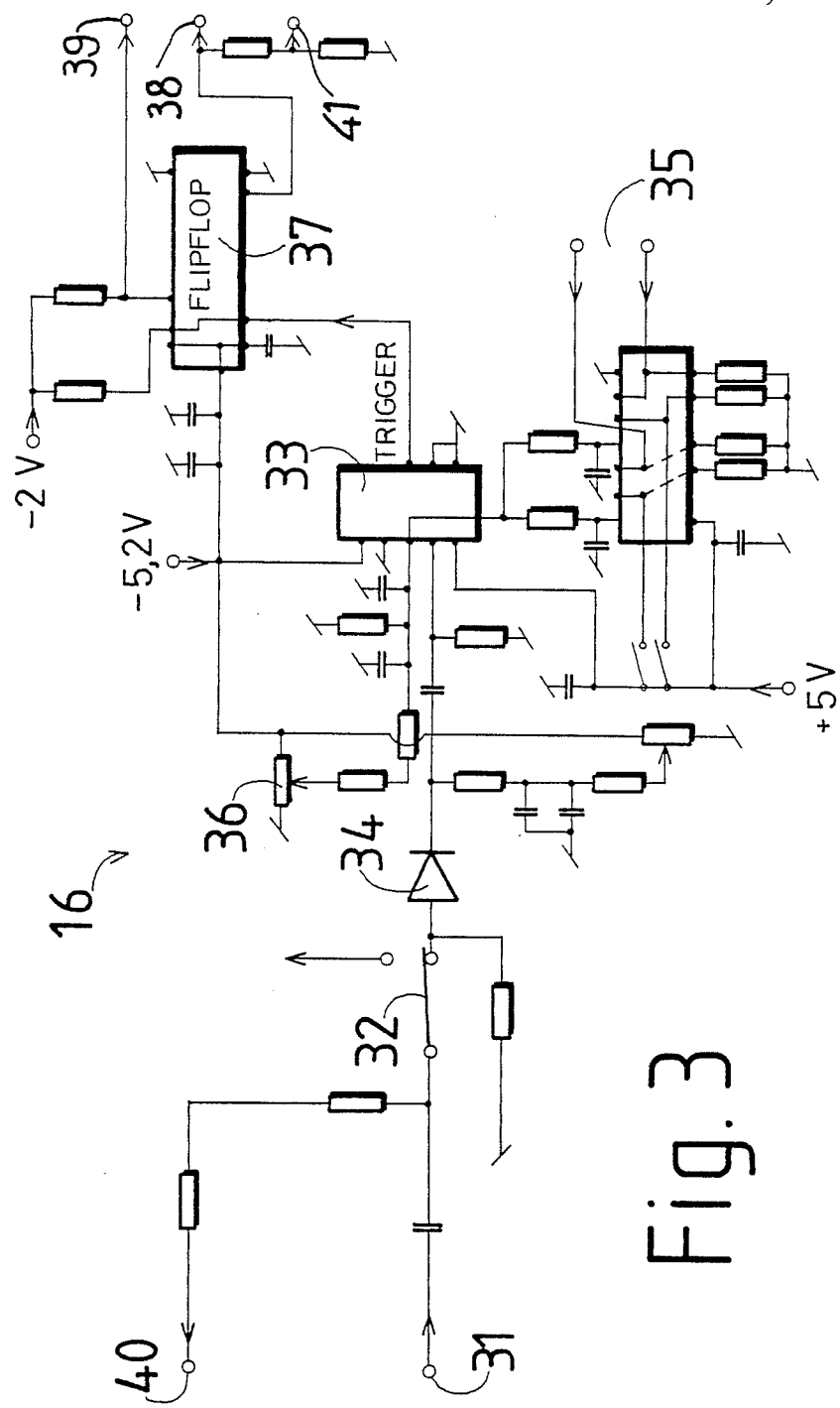
FIG. 3 is a detailed circuit diagram of a comparator as in FIG. 1.

FIG. 3 is a circuit diagram of comparator stage 16. The start and stop signals from amplifier 15 are fed to input 31. By a switch 32 the signals may be directed either to a fast trigger circuit 33 or to signal processing stage 21 for signal strength display at stage 24. Prior to input at trigger 33 the signals are limited to ca. 50 mV by a biased diode 34. Four different threshold levels may be selected by a binary coded signal from processor 1 fed to another input 35. The height of the threshold levels may be adjusted at a pot 36. The output of trigger circuit 33 is fed to a fast flipflop 37 with an output 38. Output 38 may be blocked by a window signal fed to an input 39 from window circuit 20. Check points 40 and 41 are provided for monitoring input and output signals respectively.

From output 38 of the comparator stage 16 a gating signal is fed to a gating input of counter 18. Thus, the duration of the gating signal may be counted asynchronously by the positive edges of crystal oscillator 17. Counter 18 has a reset for resetting to zero after readout of the count result. If the gating time exceeds a maximum, e.g. 54.6 μs corresponding to a measured distance of 8192 m, counter 18 generates an overflow pulse which is fed to comparator stage 16 to stop the gating signal. This may be useful when receiving weak laser impulses whereby stop signals could be lost. The overflow pulse is likewise transmitted to processor 1 to enable it for the following measurement routine. As a count of one corresponds to a distance step of 1 m, only integer distance values are counted. This implies of course rounding errors. In order to have no effect on the computed distance result these errors must be random. Thus, to avoid systematic counting errors, the signals of oscillator 17 and of comparator 16 as well as the window signal of stage 20 must be without correlation. If they are so, for one given duration of the gating signal two or even three adjoining values may be counted. From the distribution of the number of counts over these two or three adjoining values, which of course should be the most frequent ones, a more exact value of the measured distance is computed by the weighted mean. The interpolation error of the mean decreases in proportion to the inverse square root of the number of counts. This error for 10,000 counts is ±0.5 cm.

At the input 39 of comparator stage 16 a window signal is fed in from processor 1 via the window circuit 20. This window signal blanks out undesired stop signals from the trigger circuit 33 (FIG. 3). The reason for this is as follows: For detection of the very weak portions of impulses from laser 3 scattered back from object 22 the avalanche fotodiode 12 must be biased up to the break-through voltage. This releases random avalanches which show up as received signal impulses. These impulses cannot be discriminated from the signal impulses intended for measurement. Such a pop noise impulse is erroneously effective as a stop impulse at the comparator stage 16. If a genuine stop impulse arrives later on, it is ignored and lost for measurement. Such errors are avoided by use of a window signal for noise blanking. This window signal is also useful for blanking out undesired laser impulse reflections from other objects within the measured path up to the object 22 at its end. For measurements on non-cooperative objects a high sensitivity for detection of only one intended object is required. Such a sensitivity may be obtained by systematically extending the end of the window signal at repetitive measurements until the desired object is detected.

The above described window signal is also used, according to the invention, to determine an additive constant error C occurring electrically at the comparator stage 16. For counting by means of counter 18 and the clock impulses from the 150 MHz oscillator 17, with the required precision the duration of the gating signal generated by comparator 16, the edges of the gating signal must be most favourably defined. An error of the duration of 100 ps gives a distance error of 1.5 cm. With good edge slopes of 1 or 2 ns there are however errors of the measured gating times due to a gating characteristic of counter 18 differing between leading and trailing edge of its gating signal. The resulting error of the measured time of travel is an additive constant with constant conditions of operation, e.g. supply voltage and temperature. This additive constant error C is measured and applied for correction of measured duration by the following method:

The 5 MHz auxiliary oscillator 19 generates square impulses with a shape equal to that of the start- and stop signals output by amplifier 15. These auxiliary impulses are fed to the input 31 of comparator 16 instead of the start- and stop signals, while laser impulse generation at laser diode 3 is interrupted. Now, the duration of the window signal fed to input 39 of comparator 16 is adjusted to blank out laser reflections from distances between 0 m and 30 m. Thus, for any phase relation between auxiliary impulses and window signals one leading auxiliary edge is certain to fall within the blanking window, while the following leading auxiliary edge is outside the window. In that case the system comparator 16, counter 18, processor 1 gives a distance corresponding to the time between two consecutive leading auxiliary impulse edges (i.e. 200 ns) plus the constant error C, i.e. 30 m+C. Now, the duration of the window signal is set corresponding to a measured distance between 0 m and 60 m. Then one leading auxiliary edge is effective as a start signal, while second following leading edge, being outside the window, effects a stop. With the same frequency (5 MHz) of the auxiliary impulses now a distance 60 m+C is measured. The additive constant error C is then computed from the difference:

$$C = 2 \cdot (30 \text{ m} + C) - (60 \text{ m} + C).$$

If the time between two consecutive leading auxiliary impulse edges is T, the first used duration of window signal is m.T (m >0, integer) and the second used duration of window signal is n.T (n>m, integer), the measured distances are respectively m.T+C and n.T+C and the constant additive error is $$C = \frac{1}{n-m} [n \cdot (m \cdot T + C) - m \cdot (n \cdot T + C)].$$

As these "phantom" distances are measured without laser impulses, no start signals for measurement are available from processor 1. This being so, the auxiliary impulses from oscillator 19 themselves are simply used as start-measurement signals. The "phantom" distances are obtained as described above in conjunction with FIG. 1 by computing the mean of 10,000 counts for each distance.

The above mentioned difference of gating characteristic of counter 18 between leading and trailing edge of its gating signal is not the only cause of errors in distance measurement. As has been found out, the receiver avalanche fotodiode 12 has different shapes of its output impulses for different levels of received laser impulses. Errors resulting from such differences are reduced, according to the invention, by measurements with various levels of threshold signals fed to input 35 of the trigger circuit 33 of comparator stage 16 (FIG. 3). A first threshold level is set about equal to the maximum level of noise of the avalanche fotodiode 12. Now, by means of the power supply stage 23 the diode bias voltage is adjusted to obtain a noise level at which the frequency of occurrence of erroneous results of measured distance due to noise impulses is below a given level (e.g. 50%). With this diode bias and the first set threshold level of comparator 16 a first distance is measured by the method as described above. Then a second threshold level is set equal to twice the first one and a second measurement of the same distance is made. Now, by linear extrapolation from The first and second measurements a distance value corresponding to a threshold zero is computed. Although by this method an ideal linear shape of the optical and electrical impulse edges is assumed, the resulting computed distance values have proved to be rather reliable.

If no gating stop signals are available for the second threshold value, e.g. due to weak reflected laser impulses, the distance value corresponding to the threshold zero is obtained by adding an empirical value to the first measured distance.

Figure 4:
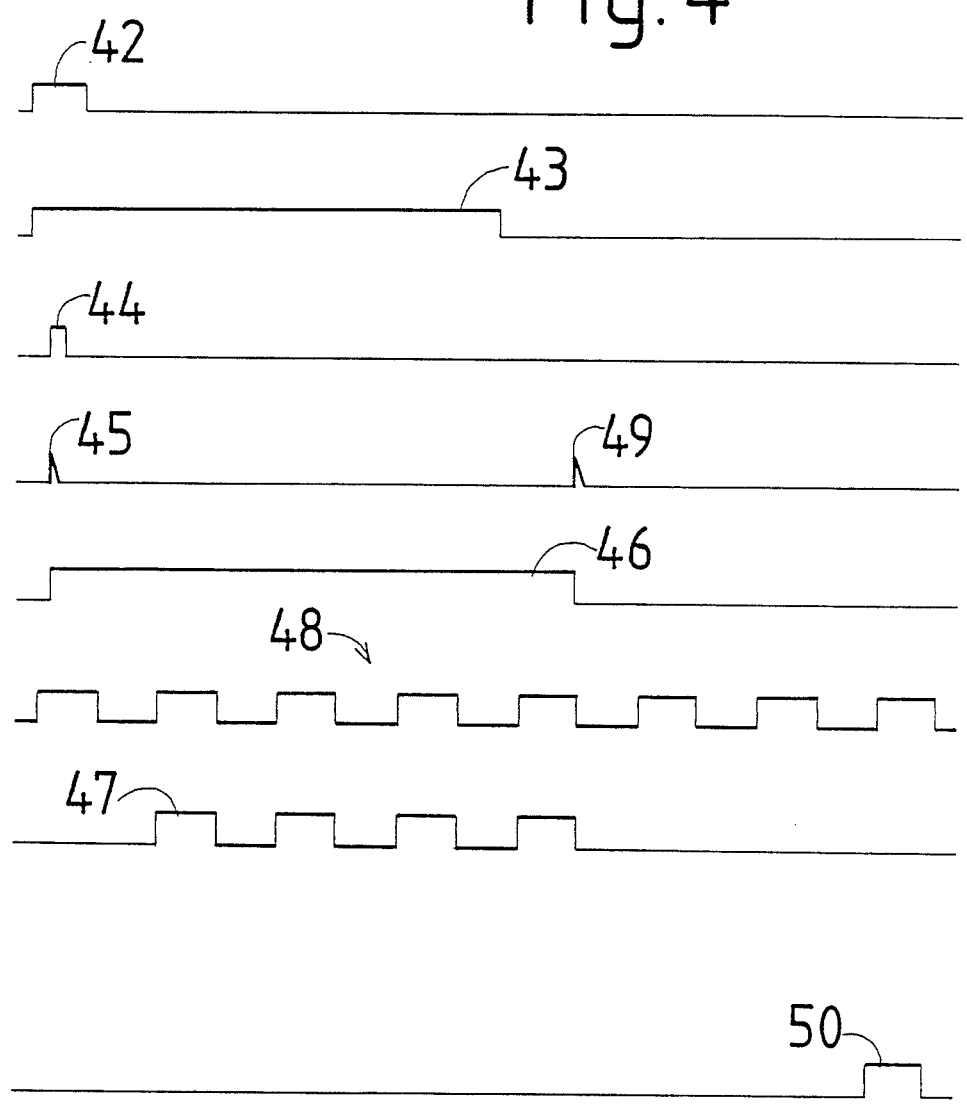
FIG. 4 shows some characteristic signals occurring in an apparatus as in FIG. 1.

FIG. 4, to give a resume, shows some characteristic signals occurring in an apparatus for electrooptical distance measurement, a preferred embodiment of which has been described above. The horizontal axis of FIG. 4 represents time. Measurement starts with a start signal 42 output by processor stage 1. Prior to each start signal 42 the level of the threshold signal is transmitted from stage 1 to stage 16 and the duration of the window signal is communicated from stage 1 to stage 20. The corresponding window signal is transmitted from stage 20 to stage 16. This window signal 43 and the start signal 42 have the same start. The light impulse 44 is triggered at laser diode 3 with a short delay via driver stage 2. With a negligible delay the light impulse 45 reaches the receiver diode 12 over the short path via prisms 5 and 10. After fotoelectric conversion impulse 45 triggers the start of the gating signal 46 at comparator 16. After the start of signal 46 a first one 47 of clock impulses 48 from crystal oscillator 17 reaches the counting input of counter 18. The count of the impulses 48 is stopped by light impulse 49 which has passed object 22 over the measured path. The count result is communicated from counter 18 to processor stage 1 after a constant delay of 70 μs corresponding to a delay of stop impulse 49 by a maximum measured path of 10 km. After reception of the count result stage 1 sends back to counter 18 a reset signal 50 for reset to zero.

Various modifications, changes and embodiments of the invention have been suggested, others may be obvious to those skilled in the art. The distance result may be reduced according to meteorological data, a meter to foot conversion, interrupt at low reflected laser pulse, tracking measurement with changing distance, computer compatible output of results etc. may be provided. This disclosure is therefore to be taken as illustrative of the present invention and not limiting thereof.

| Ref. No. | Function | Manufacturer | Catalog No. |
| --- | --- | --- | --- |
| 1 | processor | Intel | 8085 |
| 3 | Laser diode | Optel | LD 66 |
| 12 | avalanche receiver diode | AEG | BPW 28 |
| 13 | preamplifier | Avantek | UTC 10-102 M |
| 15 | amplifier | Avantek | UTC 10-102 M |
| 17 | crystal oscillator | Vectron | CO-254 VHF |
| 24 | display | SANWA | U-50 DX |
| 27 | hybrid T divider | VARI-L | FP-522 |
| 33 | trigger | Plessey | SP 9685 |
| 34 | limiter diode | HP | 5082-2835 |
| 37 | flipflop | Fairchild | 110-06 |

What is claimed is:

1. A method for electrooptical measurement of the distance between an object (22) and a reference point (5,10), whereby impulses of light are transmitted from a transmitter (3) to the object (22) and back to a photoelectric receiver (12) near to the transmitter (3) and whereby pairs of electrical signal impulses (45, 49) corresponding to the instants of transmission and of reception of the light impulses are generated by means of said photoelectric receiver (12) to obtain the time of travel of said light impulses for computing said distance, comprising the steps
   (a) generating signals (46) which last between the occurrence of at least two different threshold values at mutually corresponding edges of said pairs of signal impulses (45, 49),
   (b) gating, by means of said gating signals (46) for each threshold value, a gate (18), said gate (18) passing the output of a frequency stabilized clock-oscillator (17) on to a frequency-counter (18), while the switching instants of the gate (18) and the impulses of the clock-oscillator (17) are uncorrelated,
   (c) calculating, for each threshold value, a corresponding duration of gating signals by the weighted mean of the more frequent counts of said frequency-counter (18), and
   (d) obtaining a characteristic time of travel of said light impulses for said distance from the dependence of said calculated duration of gating signals upon the threshold value.

2. A method as claimed in claim 1, further comprising the steps
   (a) establishing a first threshold value with an order of magnitude equal to the maximum noise level of said photoelectric receiver (12),
   (b) adjusting the noise level of said receiver (12) by changing its operating point until the frequency of occurrence of erroneous results for the time of travel of the light impulses due to noise impulses, is below a given level,
   (c) calculating, from the counts for said first threshold value, a corresponding duration of gating signals,
   (d) calculating, from the counts for a second threshold value equal to about twice the first threshold value, a second duration of gating signals, and
   (e) obtaining a characteristic time of travel of the light impulses from a duration of gating signals corresponding to a threshold value zero by means of linear extrapolation from said first and second pairs of threshold values and gating signals.

3. A method as claimed in claim 2, wherein the characteristic time of travel is obtained from said first duration of gating signals by adding a fixed correction value to the duration, no gating signal being available for the second threshold value.

4. A method for electrooptical measurement of the distance between an object (22) and a reference point (5,10), whereby impulses of light are transmitted from a transmitter (3) to the object (22) and back to a photoelectric receiver (12) near to the transmitter (3), and whereby pairs of electrical signal impulses (45, 49) corresponding to the instants of transmission and of reception of the light impulses are generated by means of said photoelectric receiver (12) to obtain the time of travel of said light impulses for computing said distance and whereby the photoelectric receiver (12-18) is disabled after transmission of a light impulse by means of a disabling signal (43) of presetable duration to suppress noise and interfering signals, the time of travel of the light impulses being obtained from the duration of gating signals (46) occurring between each pair of signal impulses (45, 49), and additive constant error C occurring at the count of the duration of the gating signals (46) due to a gating characteristic differing leading and trailing edge of the gating signal, comprising the steps
   (a) gating, by means of auxiliary impulses of constant period T, a gate (16,18) passing the output of a frequency stabilized clock-oscillator (17) on to a frequency-counter (18), while the switching instants of the gate (16,18) and the impulses of the clock-oscillator (17) are uncorrelated and the disabling signal (43) is preset to a duration mT (m>0, integer),
   (b) calculating by the weighted mean of the more frequent counts of said frequency counter (18) a duration mT+C,
   (c) gating the gate (16,18) as in (a) but with the disabling signal (43) preset to a duration nT (n>m, integer),
   (d) calculating as in (b) a duration nT+C and (e) calculating the constant error C by the difference $$C = \frac{1}{n-m} [n(mT + C) - m(nT + C)], (n > m > 0).$$

5. An apparatus for electrooptical distance measurement with a means for transmitting impulses of light, a receiving means for converting said light impulses into corresponding electrical signal impulses as well as a first digital circuit (16, 17, 18) for generating a count of the time between pairs of said electrical signal impulses (45, 49), corresponding to the instants of transmission and of reception of the light impulses, at least two of said counts being used for computing said distance, the apparatus comprising a second digital circuit (1, 19, 20) for transmitting auxiliary signals to the first digital circuit (16, 17, 18), for receiving said counts from the first circuit, for storing, forming a mean value from correcting and generating a distance value from the counts, as well as for generating start-signals (42) for transmission of said impulses of light.

6. An apparatus as claimed in claim 5, comprising a second digital circuit (1, 19, 20) transmitting to the first digital circuit (16, 17, 18) calibrating impulses for measurement of time duration, at least two different threshold values for generating duration of gating signals from said pairs of signal impulses as well as disabling signals (43) to suppress undesired count-stop signals.

7. An apparatus as claimed in claim 5 or in claim 6, comprising a limiter circuit (34) in front of the first digital circuit (16, 17, 18), said limiter circuit (34) limiting the pairs of electrical signal impulses (45, 49) to a preset level prior to evaluation.

* * * * *

UNITED STATES PATENT AND TRADEMARK OFFICE
CERTIFICATE OF CORRECTION

PATENT NO. : 4,553,836
DATED : November 19, 1985
INVENTOR(S) : Dietrich Meier and Hans-Ulrich Minder It is certified that error appears in the above-identified patent and that said Letters Patent is hereby corrected as shown below:

Column 4, line 9 - delete "sigral" and substitute therefor --signal--

Column 7, line 21 - delete "abvi" and substitute therefor --obvi--

Column 7, line 41 - delete "110-06" and substitute therefor --11C-06--

Column 8, line 52 - after "differing" insert --between--

Column 10, line 1 - after "from" insert --,--

Signed and Sealed this

Twentieth Day of May 1986

[SEAL]

Attest:

DONALD J. QUIGG

Attesting Officer

Commissioner of Patents and Trademarks